US007006854B2

(12) United States Patent
Choi

(10) Patent No.: US 7,006,854 B2
(45) Date of Patent: Feb. 28, 2006

(54) FOLDER TYPE MOBILE TERMINAL COUPLING MECHANISM

(75) Inventor: Yong-Chai Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 447 days.

(21) Appl. No.: 10/320,017

(22) Filed: Dec. 16, 2002

(65) Prior Publication Data

US 2004/0005916 A1   Jan. 8, 2004

(30) Foreign Application Priority Data

Jul. 2, 2002   (KR)   .................... 10-2002-0038013

(51) Int. Cl.
*H04M 1/00*   (2006.01)
(52) U.S. Cl. ................ 455/575.3; 455/90.1; 455/90.3; 455/575.4; 455/575.1; 455/575.2; 455/575.6; 379/433.01; 379/433.11; 379/433.12; 379/433.13; 361/814; 361/572
(58) Field of Classification Search .......... 379/433.01, 379/433.11, 433.12, 433.13; 361/752, 814; 455/90.1, 90.3, 575.4, 575.1, 575.2, 575.6
See application file for complete search history.

(56) References Cited

U.S. PATENT DOCUMENTS 4,912,602 A * 3/1990 Zurek et al. ................ 361/752
6,111,760 A * 8/2000 Nixon ......................... 361/814
6,782,273 B1    8/2004 Ono et al.
2001/0044320 A1  11/2001 Ono et al.
2004/0203484 A1 * 10/2004 Charlier et al. ............ 455/90.1
2004/0203514 A1 * 10/2004 Cheng et al. .............. 455/90.3
2005/0036605 A1 *  2/2005 Mulligan et al. ...... 379/433.01

FOREIGN PATENT DOCUMENTS

CN      1323150 A     11/2001
JP      2000-031655    1/2000

* cited by examiner

*Primary Examiner*—Joseph Feild
*Assistant Examiner*—David Q. Nguyen
(74) *Attorney, Agent, or Firm*—Lee, Hong, Degerman, Kang & Schmadeka

(57) ABSTRACT

In accordance with one aspect of the invention, a folding section of a mobile communication device comprises: an upper cover; a lower cover rotatably connected to a main body and engaged with the upper cover; an engaging portion formed between the upper cover and the lower cover for connecting the upper and lower covers, wherein the engaging portion comprises: a hook part protruding from the inner surface of the upper cover; and a hook engaging part formed at the lower cover facing the upper cover for engaging the hook parts; and a cap inserted into the hook engaging part so as to prevent the hook part from releasing from the hook engaging part.

16 Claims, 6 Drawing Sheets an upper cover; a lower cover rotatably connected to a main body and engaged with the upper cover; an engaging portion formed between the upper cover and the lower cover for connecting the upper and lower covers, wherein the engaging portion comprises: a hook part protruding from the inner surface of the upper cover; and a hook engaging part formed at the lower cover facing the upper cover for engaging the hook parts; and a cap inserted into the hook engaging part so as to prevent the hook part from releasing from the hook engaging part.

FOLDER TYPE MOBILE TERMINAL COUPLING MECHANISM

CROSS-REFERENCE TO RELATED APPLICATIONS

Pursuant to 35 U.S.C. § 119(a), this application claims the benefit of earlier filing date and right of priority to the Korean Application No. 2002-38013, filed on Jul. 2, 2002, the content of which is hereby incorporated by reference herein in its entirety.

BACKGROUND OF THE INVENTION

1. Field of the Invention

The present invention relates to a folder type mobile terminal, and more particularly, to a folder type mobile terminal having an improved coupling mechanism that simplifies the assembly process and is space efficient.

2. Description of the Background Art

Due to the fact that larger display liquid crystal screens can be installed on the folding section of a folder type mobile terminal, such terminals are popular and in growing demand.

Especially, a dual LCD type folder type mobile terminal has been developed in which an LCD is mounted on an outer side of the folder and another on the inner side of the folder.

The folder type mobile terminal includes a main body having a circuit board installed therein and menu buttons and dial buttons provided on the front face thereof, and a folder rotatably coupled with the main body and having an LCD attached on the inner face and an outer face thereof.

FIG. 1 is an exploded perspective view of the folder of a mobile terminal in accordance with a conventional art, and FIG. 2 is a front view of the folder of the mobile terminal in accordance with the conventional art.

A conventional folding portion (i.e., folder) includes an upper cover 102 forming the front exterior of a terminal, a lower cover 104 coupled with the upper cover 102 and rotatably connected to a main body (not shown), and a circuit board 112 inserted in the inside upper cover 102 and the lower cover 104 and having an auxiliary LCD 106 mounted on the front face thereof, a main LCD 108 mounted on a rear face thereof and depending on design a receiver 110 mounted on one side thereof.

A front window 114 is attached at an outer side of the upper cover 102, and an auxiliary LCD pad 116 is attached at the inner side of the upper cover 102. A rear window 118 is attached at an outer side of the lower cover 104, and a main LCD pad 120 is attached at the inner side of the lower cover 104. A hinge connecting part 122 is formed at one side of the lower cover 104, which is rotatably connected to the main body. The upper cover 102 and the lower cover 104 are engaged by a screw 124.

The engaging structure of the upper cover 102 and the lower cover 104 will now be described in detail with reference to FIGS. 3 and 4.

A screw engaging part 132 is formed at four corners of the upper cover 102, so that a screw 124 can be engaged therewith, and a screw insertion part is formed at the four corners of the lower cover 104, into which the screw 124 is inserted.

A metal ring 138 with a spiral line formed thereon is formed at an inner circumferential face of the screw engaging part 132, so that the screw 124 can be engaged therein.

A cap 130 covering the screw insertion part 134 is inserted into the screw insertion part 134 of the lower cover to cover the screw insertion part 134 in consideration of a design after engagement of the screw 124.

The assembly process of the upper cover and the lower cover of the conventional art will now be described.

The metal ring 138 is inserted in injection-molding of the front cover 102 to be fixed at the screw engaging part 132 of the front cover 102. After the circuit board 112 is disposed between the upper cover 102 and the lower cover 104, the screw 124 penetrates the screw insertion part 134 formed at the lower cover 104 to engage with the metal ring 138 fixed at the upper cover 102, and then the cap 130 is inserted into the screw insertion part 134 of the lower cover 104, thereby completing the assembly.

Since the screw engaging part and the screw insertion part are formed for a screw engagement at the upper cover and the lower cover, they occupy much space in the covers and thus space utilization is degraded.

In addition, since the screw 124 should be engaged after the upper cover 102 and the lower cover 104 are arranged in a facing manner in the assembly operation, the assembly process is complicated, its assembly time is lengthened, and productivity is degraded. Especially, due to the screw engagement, the cap 130 is limited to the circular shape, limiting designer aspects of the folder.

In addition, since the metal ring 138 should be inserted for the screw engagement with the upper cover 102, the working process is complicated, fabrication cost is increased, and productivity is degraded.

SUMMARY OF THE INVENTION

In accordance with one aspect of the invention, a folding section of a mobile communication device comprises: an upper cover; a lower cover rotatably connected to a main body and engaged with the upper cover; an engaging portion formed between the upper cover and the lower cover for connecting the upper and lower covers, wherein the engaging portion comprises: a hook part protruding from the inner surface of the upper cover; and a hook engaging part formed at the lower cover facing the upper cover for engaging the hook parts; and a cap inserted into the hook engaging part so as to prevent the hook part from releasing from the hook engaging part.

In certain embodiments the cap protrudes from the surface of the lower cover so that the cap is in contact with the main body to buffer an impact resulting from the opening and closing of the folder. The hook part, preferably, protrudes approximately vertically from the inner face of the upper cover, and a hooking protrusion is formed at an end portion of the hook part, so as to engage the hook engaging part. In one embodiment, the hook part is an integral extension of the upper cover and has an elastic property so that it bends in response to pressure. The hook part may be formed approximately at a corner of the inner side of the upper cover.

In one or more embodiments, the hook engaging part comprises an opening into which the hook part can be inserted, and wherein the hook engaging part further comprises a hooking jaw for engaging the hook part, and wherein the cap is inserted in an insertion reserve portion in the hook engaging part so as to prevent the hook part from releasing the hook engaging part. The cap is made of a rubber material, for example, having an elastic property that prevents the hook part to be released from the hook engaging part.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

Reference will now be made in detail to a preferred embodiment of the present invention, examples of which are illustrated in the accompanying drawings.

DETAILED DESCRIPTION OF THE PREFERRED EMBODIMENTS

Figure 1:
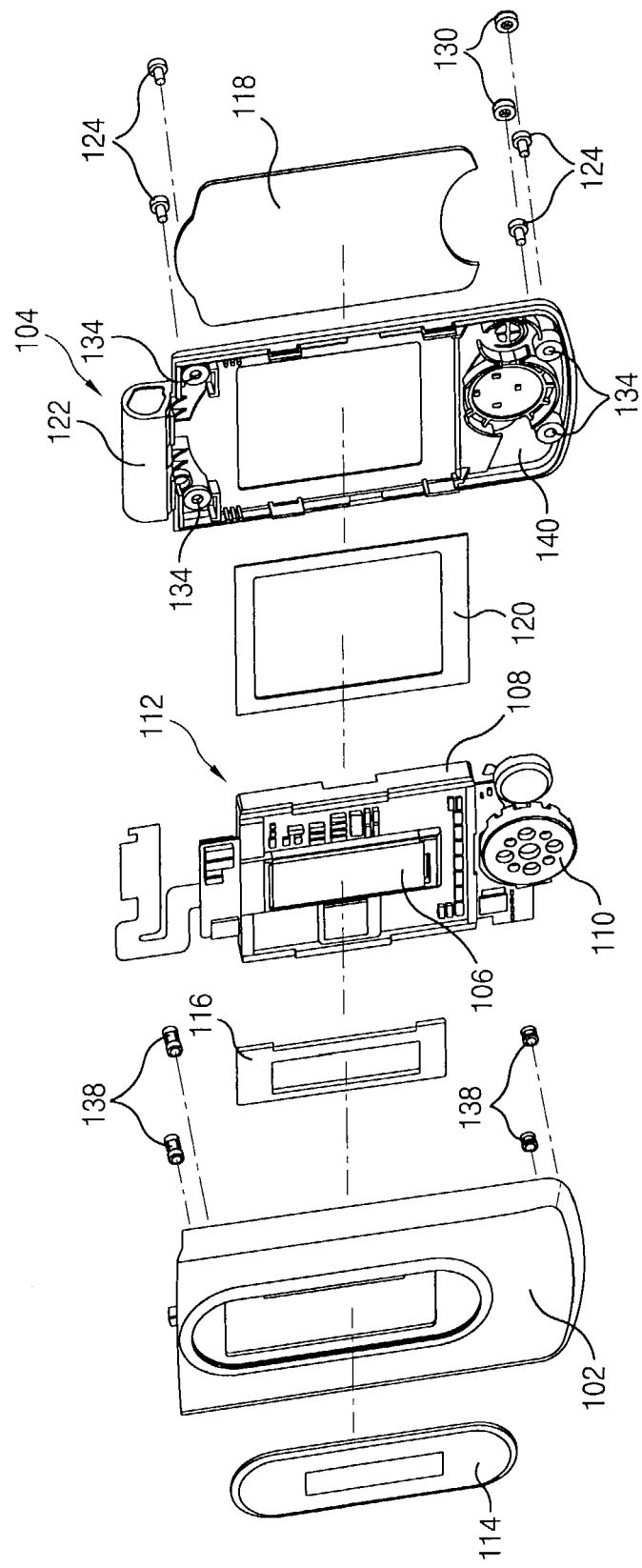
FIG. 1 is an exploded perspective view of a folder of a mobile terminal in accordance with a conventional art.
Figure 2:
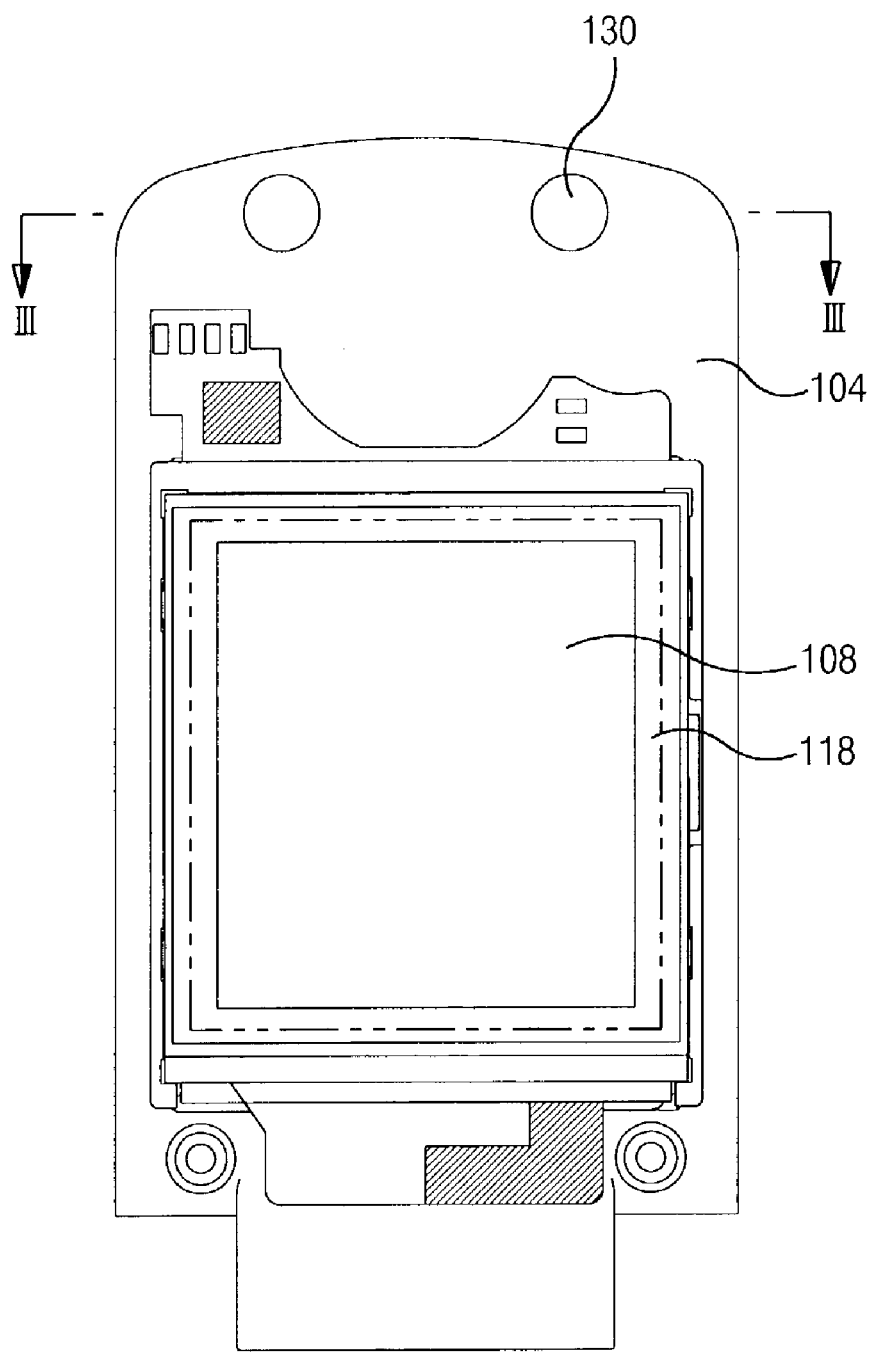
FIG. 2 is a front view showing an assembled folder of a mobile terminal in accordance with the conventional art.
Figure 3:
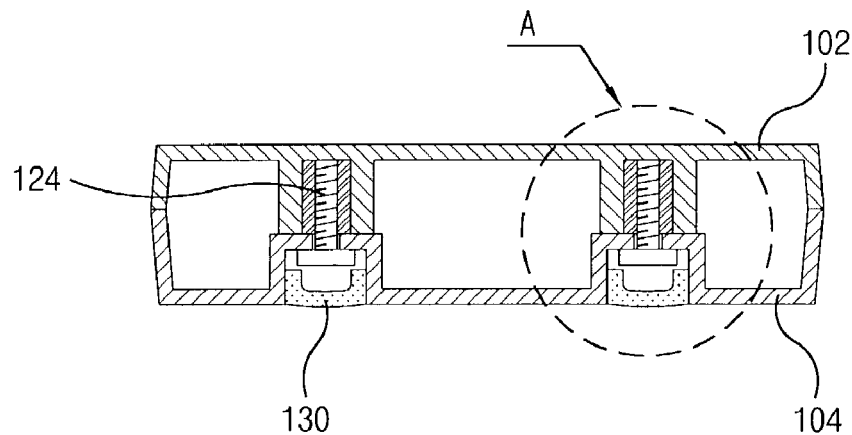
FIG. 3 is a sectional view taken along line III—III of FIG. 2.
Figure 4:
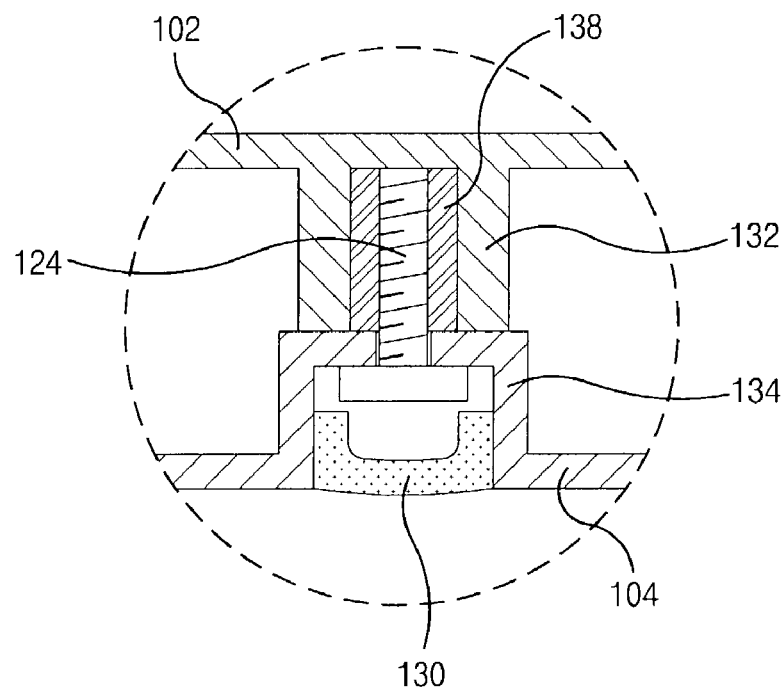
FIG. 4 is an enlarged view of a portion 'A' of FIG. 3.
Figure 5:
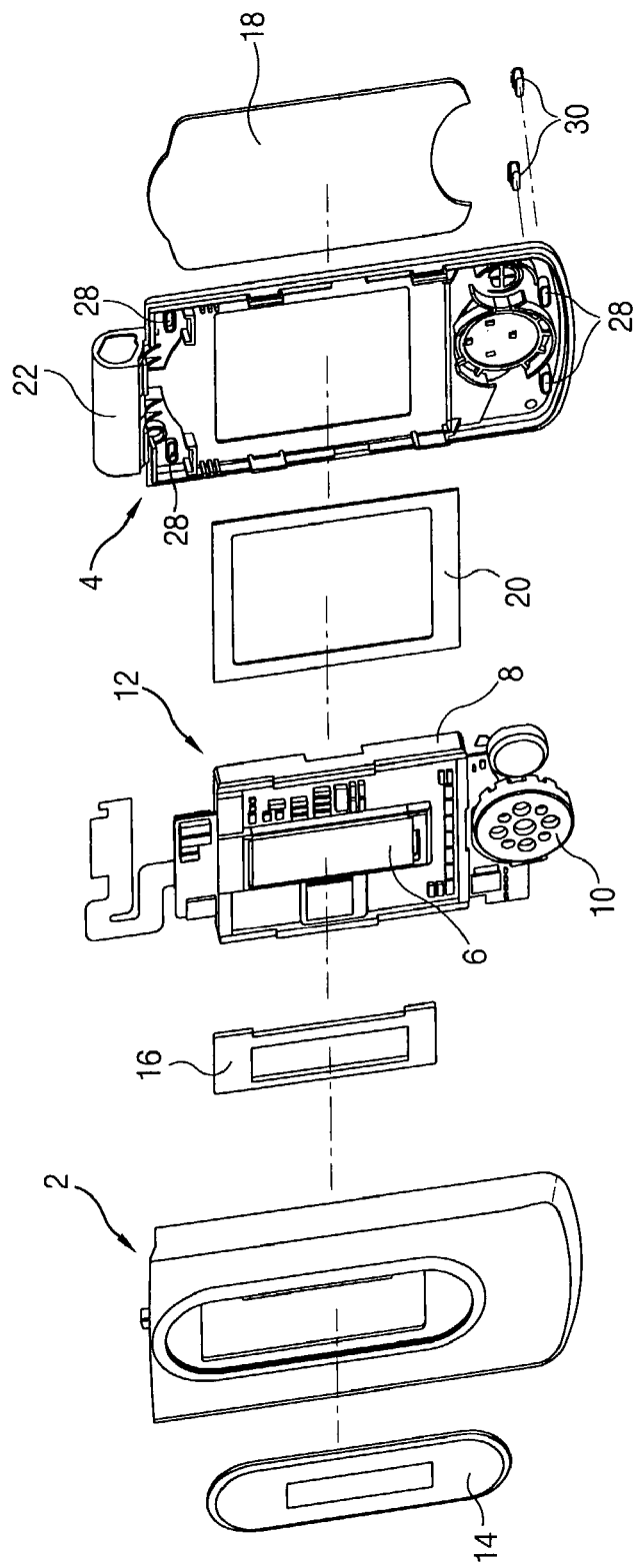
FIG. 5 is an exploded perspective view of a folder of a mobile terminal in accordance with one embodiment of the present invention.
Figure 6:
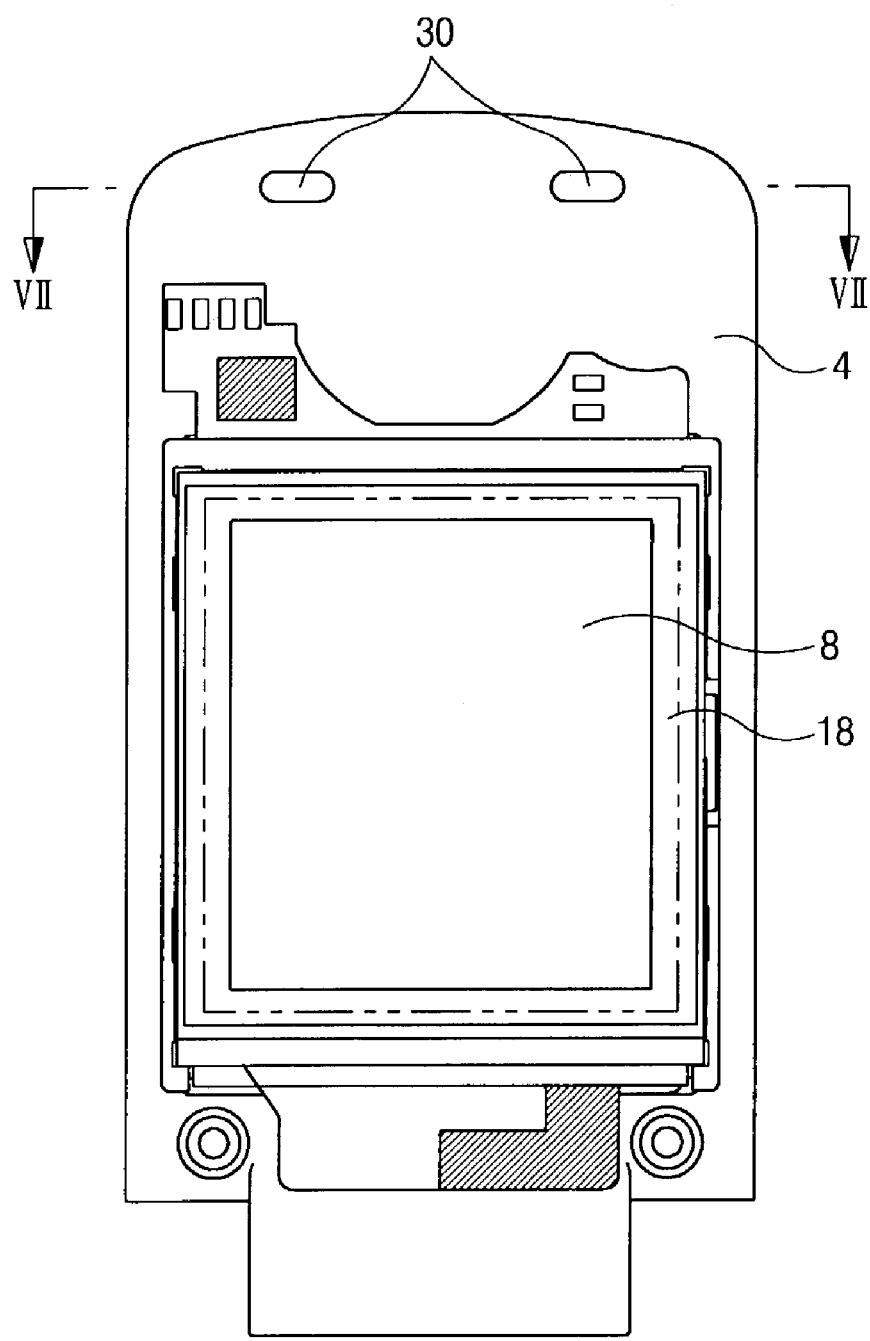
FIG. 6 is a front view showing an assembled folder of a mobile terminal in accordance with one embodiment of the present invention.

Referring to FIGS. 5 and 6, a folding section of a portable mobile communication terminal (i.e., folder) comprises an upper cover 2, a lower cover 4 rotatably connected to the main body (not shown) and engaged with the upper cover 2, and a circuit board 12 disposed between the covers 2 and 4, having an auxiliary LCD 6 attached on a front face, a main LCD 8 attached at a rear face, and preferably a receiver 10 mounted at one side, for example.

An external display window 14 attached at the front face of the upper cover 2 so that a screen of the auxiliary LCD 6 can be displayed externally. In some embodiments, an auxiliary LCD pad 16 is attached at a rear face of the upper cover 2.

An internal display window 18 is attached at a front face of the lower cover 4 so that a screen of the main LCD 8 can be displayed. A main LCD pad 20 is attached at a rear face of the lower cover 4, and a hinge engaging part 22 is formed at one side of the lower cover 4, so as to be rotatably connected to the main body (not shown).

Figure 7:
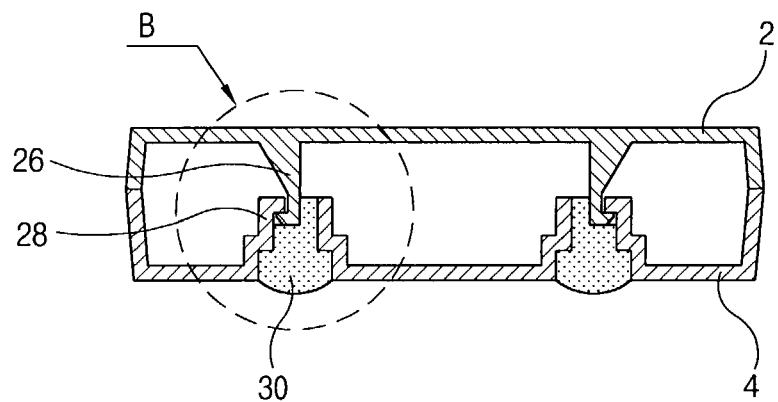
FIG. 7 is a sectional view taken along line VII—VII of FIG. 6.
Figure 8:
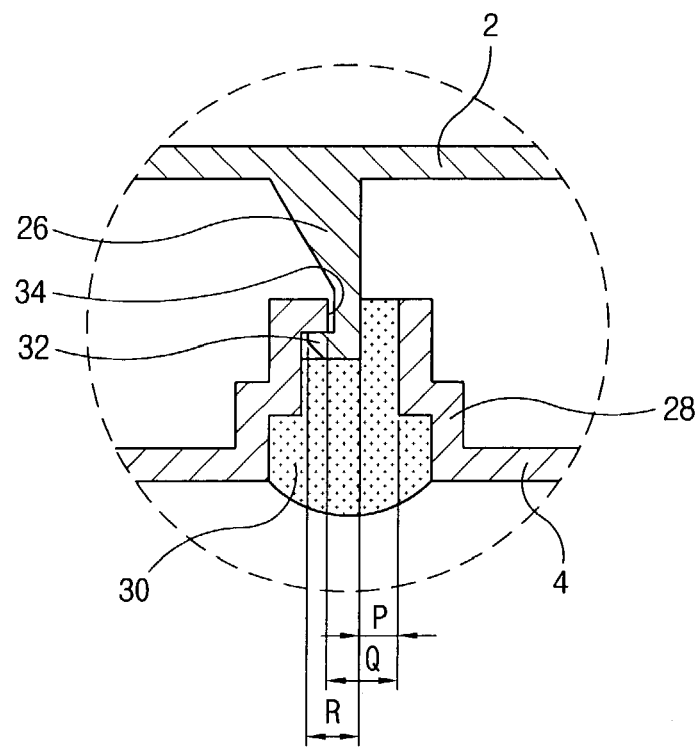
FIG. 8 is an enlarged view of a portion 'B' of FIG. 7.

Engaging portions are formed at the upper cover 2 and the lower cover 4 to engage them as provided in more detail below. As shown in FIGS. 7 and 8, the engaging portions include a plurality of hook parts 26 protruded vertically and inwardly from a marginal portion of the upper cover 2; one or more hook engaging parts 28 formed at a marginal portion of the lower cover 4 at which the hook part 25 is hooked, and a cap 30 inserted into the hook engaging part 28 to prevent the hook part 26 from releasing from the hook engaging part 28.

The hook part 26 is formed protruded with a certain length in a vertical direction extending from the inner face of the upper cover 2, and is tapered inwardly toward its distal portion. Hook part 26 comprises a hooking protrusion 32 bent at an approximately right angle at the distal end of the hook part 26 for engaging the hooking jaw 34.

It is preferred that the hook part 26 is formed at approximately four corners of the upper cover 2 so as to increase space utilization. In certain embodiments, the hook part 26 is an integral extension of the upper cover, and has an elastic property.

The hook engaging part 28 protrudes inwardly from the lower cover 4. Hook engaging part 26 comprises an opening into which the hook part 26 is inserted, and a hooking jaw 34 is formed at an inner distal portion of the hook engaging part 28, at which the hooking protrusion 32 of the hook part 26 is hooked.

Referring to FIG. 8, a width (Q) of the opening into which the hook part 26 of the hook engaging part 28 is inserted is larger than a width (R) of the hooking protrusion 32 of the hook part 26, so that the hook part 26 can be easily inserted into the opening in the hook engaging part 28.

When the hooking protrusion 32 of the hook part 26 is inserted into the opening it engages the hooking jaw 34. An insertion reserve portion with a certain width (P) provides sufficient space for the hook part 26 to release from the hook engaging part 28. In this respect, however, the cap 30 serves to prevent release of the hook part 26 by being inserted into the insertion reserve portion (P).

The cap 30 is preferably made of a rubber material with a certain elastic property. Thus, even if the cap 30 is maximally contracted it would not allow the hook part 26 to be released from the hooking jaw 34. Thus, the release of the hook part 26 is restricted by the cap 30, when cap 30 is inserted.

The cap 30 is formed in the same configuration as the inside of the hooking engaging part 28 so that it can be inserted into the hook part 26. An upper surface of the cap 30 is formed protruded with a certain width from the surface of the lower cover 4, so that when the folder is opened or closed, the main body and the upper surface of the cap 30 are in contact with each other to buffer an impact resulting from the opening and closing of the folder.

As described, the folder of a mobile terminal of the present invention has many advantages. That is, for example, since the hook part 26 is formed at the upper cover 2 of the folder and the hook engaging part 28 is formed at the lower cover 4, as the hook part 26 is inserted into the hook engaging part 28, the assembly is completed. Thus, the assembly process is simple, the assembly time is shortened, and its fabrication cost can be reduced. Further, since the space taken up by the hook part 26 and the hook engaging part 28 at the upper cover 2 and the lower cover 4 is comparatively small, the space utilization is increased.

The cap 30 inserted into the hook engaging part 28 can be fabricated in various shapes and forms, to accommodate and promote diverse designs for the terminal. In some embodiments the top surface of the cap protrudes from the surface of the lower cover, such that when the folder is opened and closed, the main body of the terminal and the cap come in contact with each other. Thus, the impact resulting from opening and closing the folder is absorbed by the cap rather than the main body or the folder itself.

Although particular embodiments of the invention have been shown and described, it will be apparent to those skilled in the art that changes and modifications may be made without departing from the invention in its broader aspects, and therefore, the appended claims are to encompass within their scope all such changes and modifications that fall within the true scope of the invention.

What is claimed is:

1. A folder of a mobile terminal comprising:
   an upper cover;
   a lower cover configured for rotatably connecting to a main body and engaging the upper cover for receiving a an LCD in between the upper and lower covers;
   an engaging portion formed between the upper cover and the lower cover for connecting the upper and lower covers, wherein the engaging portion comprises: at least a hook part protruding from the inner surface of the upper cover; and at least a hook engaging part formed at the lower cover facing the upper cover for engaging the hook parts; and
   a cap inserted into the hook engaging part so as to prevent the hook part from releasing from the hook engaging part.

2. The folder of claim 1, wherein the hook part protrudes approximately vertically from the inner surface of the upper cover, and a hooking protrusion is formed at an end portion of the hook part, so as to engage the hook engaging part.

3. The folder of claim 1, wherein the hook part is an integral extension of the upper cover.

4. The folder of claim 1, wherein the hook part has an elastic property so that it bends in response to pressure and wherein the hook part is formed approximately at a corner of the inner side of the upper cover.

5. The folder of claim 2, wherein the hook engaging part comprises an opening into which the hook part can be inserted, and wherein the hook engaging part further comprises a hooking jaw for engaging the hook part.

6. The folder of claim 5, wherein width of the opening into which the hook engaging part penetrates is larger than width of the hooking protrusion of the hook part.

7. The folder of claim 5, wherein the hook engaging part is integrally formed with the lower cover.

8. The folder of claim 1, wherein the cap is inserted in an insertion reserve portion in the hook engaging part so as to prevent the hook part from releasing the hook engaging part.

9. The folder of claim 8, wherein the cap is made of a rubber material having an elastic property that prevents the hook part to be released from the hook engaging part.

10. A folding section of a mobile communication device comprising:
    an upper cover;
    a lower cover rotatably connected to a main body and engaged with the upper cover;
    an engaging portion formed between the upper cover and the lower cover for connecting the upper and lower covers, wherein the engaging portion comprises:
    a hook part protruding from an inner surface of the upper cover; and
    a hook engaging part formed at the lower cover facing the upper cover for engaging the hook part; and
    a cap inserted into the hook engaging part so as to prevent the hook part from releasing from the hook engaging part.

11. The folder of claim 10, wherein the cap protrudes from the surface of the lower cover so that the cap is in contact with the main body to buffer an impact resulting from opening and closing of the folder.

12. The folder of claim 10, wherein the hook part protrudes approximately vertically from the inner surface of the upper cover, and a hooking protrusion is formed at an end portion of the hook part, so as to engage the hook engaging part.

13. The folder of claim 10, wherein the hook part is an integral extension of the upper cover and has an elastic property so that it bends in response to pressure.

14. The folder of claim 10, wherein the hook part is formed approximately at a corner of the inner side of the upper cover.

15. The folder of claim 10, wherein the hook engaging part comprises an opening into which the hook part can be inserted, and wherein the hook engaging part further comprises a hooking jaw for engaging the hook part, and wherein the cap is inserted in an insertion reserve portion in the hook engaging part so as to prevent the hook part from releasing the hook engaging part.

16. The folder of claim 10, wherein the cap is made of a rubber material having an elastic property that prevents the hook part to be released from the hook engaging part.

* * * * *